Feb. 18, 1936.                J. K. NORTHROP                2,031,177
                           AIRCRAFT SPEED CONTROL
                             Filed March 12, 1935
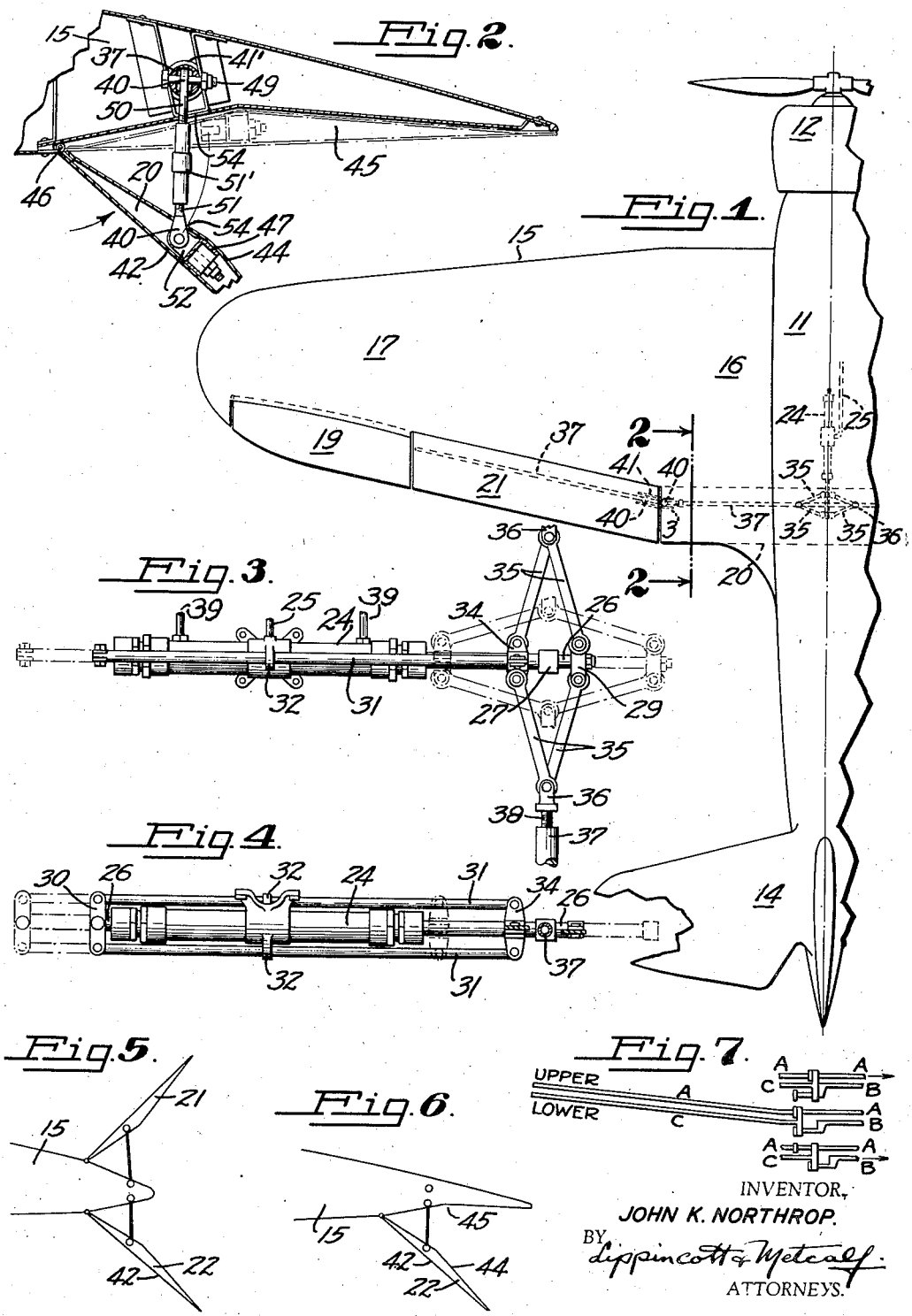
INVENTOR,
JOHN K. NORTHROP.
BY
Lippincott & Metcalf
ATTORNEYS.

Patented Feb. 18, 1936

2,031,177

UNITED STATES PATENT OFFICE 2,031,177

AIRCRAFT SPEED CONTROL

John K. Northrop, Los Angeles, Calif., assignor to The Northrop Corporation, Inglewood, Calif., a corporation of California Application March 12, 1935, Serial No. 10,636

2 Claims. (Cl. 244—29)

My invention relates to heavier-than-air craft, and more particularly to means and method of changing the effective camber of the wings thereof.

Among the objects of my invention are: To provide a means and method of controlling the air speed of an airplane; to provide a means and method of changing the surface contours of a wing; to provide a means and method of changing a wing having a relatively large effective camber to one having a minimum effective camber; to provide a means and method of adding drag without accompanying pitching moment to an airplane wing; to provide a means and method of reducing the speed of heavier-than-air craft; to provide such a means and method which is operative without the necessity of compensation by tail surfaces; to provide a means and method of limiting terminal velocities of an airplane in a dive; to provide a means and method of stabilizing an airplane in a dive; to provide means and method of changing the effective lift and drag of an airplane wing at a given angle of attack at will; and to provide airplane wing flaps operable at both high and low angles of attack.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

I am fully aware of the fact that wing flaps of various types have hitherto been used for reducing the flying speed of airplanes. As an example, I cite the copending application of Allen, Klein, Millikan and Northrop, Serial No. 676,892, filed June 21, 1933, in which flaps forming a part of the lower wing surface adjacent the trailing edge are extended at high attack angles to create an increase in lift, thus reducing landing speed and allowing a steeper glide. Such flaps, however, also increase drag as well as lift at these angles, which increase, of course, is highly beneficial when approaching the ground for landing as the increased drag absorbs excess energy and rapidly reduces speed.

The present invention broadly contemplates the use in general of such lower surface flaps by themselves (in landing) and in addition provides for the use of other flaps which, at all attack angles will add a force to the wing which will oppose the pitching moment which would be created by the use of lower surface flaps alone. Thus, I can obtain, from a foundation having a normal contour, a wing having additional lift and drag at high attack angles, a wing having additional drag and normal lift at other angles, or a wing having a high drag and minimum effective camber at lower attack angles, as desired. No untoward pitching moment will be present in the latter two cases. It is, of course, desirable and a part of my invention that intermediate ratios of effective camber be made available at various attack angles and under various conditions of operation.

It has been pointed out above that increased drag and lift at high angles of attack are highly desirable upon landing. Likewise increased drag devoid of pitching moment is highly desirable to limit air speed during military maneuvers or acrobatics.

The following illustration will serve as an example of the use of my invention. Modern bombing planes are fast, and as their velocity is imparted to the bombs on release, complicated bomb sights are required in order that targets be hit. These sights must take account of air speed, ground speed, and inclination to the earth's plane, or diving angle. If, however, the bombing plane can be placed in a vertical dive and the bombs released during travel along an earth perpendicular, no lateral motion will be imparted to the falling objects, the plane's speed merely adding to the initial velocity of fall. Thus, only windage need be allowed for, and the pilot may sight the plane on the target. Also, present high diving speeds seriously reduce the time available for sighting a plane on a target and releasing bombs therefrom.

The application of the force of gravity to the plane in vertical dives causes continuous acceleration of the plane until the limiting speed is reached. This speed is constantly increasing due to the refinements of modern design, and it may cause unwanted effects, among them, fluttering of control surfaces on wings or blanketing of tail surfaces with consequent reduction of control, and there is always present the necessity of extreme care being used by the pilot in returning to normal horizontal flight position in order that the lifting structures be not collapsed from excessive stress. Bringing the plane out of a dive slowly may cause an objectionable loss of altitude.

It would not be practical, however, to attempt to retard a diving plane by opening lower surface flaps alone at diving angles. In such dives, the pitching moment of any conventional wing tends to decrease the angle of attack and to cause the plane to come out of the dive upside down. The tail surfaces are used to counteract this pitching moment. If lower wing flaps were to be opened, this pitching moment would be greatly increased, and it is possible that the moment developed could not be overcome and the plane kept in a steady dive, or that the amount of counteractive force necessary on the tail surfaces would be such as to greatly reduce the maneuverability of the plane, or require the use of excessively heavy tail surface.

My invention, however, allows the use of wing flaps for the reduction of terminal velocities without the development of an excessive pitching moment such as would be caused by the use of lower surface flaps alone.

One means of utilizing my method is to extend both upper and lower wing flaps, using the lower surface flaps alone for landing at high attack angles, but using both flaps simultaneously to increase drag, as, for example, in a dive, the opposing flaps to be preferably closely associated on the wing so that the stresses are counteracted in a relatively short distance and without transmission through any large amount of plane structure. By such opposition, objectionable pitching moments are eliminated.

While a preferred means of operating the flaps will be herein described, that particular means is no part of the instant invention and is, among others, described and claimed in the copending application of Arthur L. Klein, Serial No. 753,871, filed November 20, 1934. Any other convenient means may be used without departing from the essence of the present invention.

In the drawing:

Figure 1 is a partial plan view of a conventionalized airplane showing the location of the wing flaps and indicating the position of the operating mechanism.

Figure 2 is a sectional view of the trailing edge of a wing showing the flap-operating link. The plane of section is indicated by the line 2—2 of Figure 1.

Figure 3 is a plan view of a hydraulic flap operating mechanism.

Figure 4 is a side view of the operating means shown in Figure 3.

Figure 5 is a diagram showing upper and lower wing flaps open.

Figure 6 is a diagram showing the contour of the wing with only the lower wing flap open.

Figure 7 is a three-part diagram showing three positions of the selecting mechanism.

While it is well within the skill of those acquainted with the art to adapt my invention to various types of aircraft, I prefer to describe my invention as applied in preferred form to one of the "Northrop" type planes which are, in general, characterized by being of all-metal construction with a single low wing passing underneath the fuselage. The adaptation to other types will be obvious to those skilled in the art.

In such a plane shown in partial outline in Figure 1, the fuselage 11 is provided at one end with the usual engine and propeller 12 and at the other with the customary vertical and horizontal tail surfaces 14. A wing assembly 15 passes under, and is fastened securely to the fuselage. For convenience, this wing may be divided into a central section 16 and end sections 17, one of which is not shown. In the design of my planes, I prefer to taper the end sections 17 so that the wing tip is somewhat narrower than the center section. Each end section is provided with the usual aileron 19, preferably forming the trailing edge of perhaps the outer third of the end sections.

The center section 16 is provided with a lower surface center flap 20 as indicated by the dotted lines in Figure 1, and in the section as shown in Figure 2. This flap extends on both sides of the fuselage.

That part of each end section between the end of the center flap 20 and the ailerons is provided with two wing flaps, an upper surface flap 21 and an outer lower surface flap 22, as shown in Figure 5. These flaps form part of the normal lifting surfaces of the wing when closed, are pivoted to the wing at approximately the same distance intermediate the leading and trailing edge, and, when closed, their rear edges converge closely adjacent each other.

I prefer to control the lower surface flaps alone for landing purposes, but to utilize both upper and lower surface flaps when limiting diving speed. One preferred form of control mechanism will be described, one which is described in the application of Klein supra.

A source of liquid under pressure (not shown) is provided, either driven from the airplane motor, or by a small separate electric motor or by hand. Interlinked flap-operating means are controlled by the liquid, and as the means are substantially alike, the complete system for operating one set of flaps will be described in full, the interlinkage of the two systems being later referred to and described.

Liquid is fed from the source, under control of the pilot, into a hydraulic cylinder 24 through a central pipe 25 between two opposed pistons not shown, each connected to piston rods 26 passing through opposite ends of the cylinder. One piston rod passes straight out through a bearing 27 and is capped by a single rod toggle block 29, the other piston rod being inserted into a transmission rod block 30 carrying a pair of transmission rods 31—31, which, after passing through rod bearing 32—32, are inserted in a double rod toggle block 34. Each toggle block carries a pair of oppositely extending toggle arms 35—35 which join a pair of wing fittings 36—36 to which laterally extending wing rods 37—37 are attached, preferably by a long screw thread 38. When the pistons are forced apart by the pressure of the liquid air between, the toggle is extended, thus causing the wing rods to move laterally toward the fuselage. In order to return the pistons to their original position, I prefer to supply the liquid under pressure from the source to the opposite sides of the pistons through end inlets 39—39, whereupon the toggle assumes its original shape and the wing rods return to their original position under positive control of the pilot, and it is this motion which I utilize to open and close the wing flaps. The liquid may be controlled by the use of well known types of four-way valves.

As the wing rods, in their passage through the wing are preferably placed near the trailing edge, in order to be available to operate the trailing edge flaps, it may be desirable (dependent on wing planform) in order that the rods pass along the wing parallel to the flaps, to change their direction somewhat, due to the tapered end section. This is easily done, however, by providing the rods with two universal joints 40—40, and changing direction at that point. A sleeve 41 may be provided to take up the directional thrust.

As the wing rod passes along the wing, wing bearings 41' are provided at suitable intervals and where wing rods are coextensive with the flaps, flap-operating space toggles are provided as shown in Figure 2.

Here, the flap 20, for example is of triangular section, the lower surface 42 being a continuation of the lower wing surface, the upper surface 44 fitting into a wing well 45 when the flap is closed. The flap is hinged on a pivot 46 and is provided with a space toggle fitting 47 firmly attached to the flap slightly forward of its long axis. The wing rod is pierced, and a space toggle arm hinged thereto by a space toggle bolt 49. This space toggle arm comprises a wing rod section 50, a flap section 51, and a central turn buckle 51' threaded to each of them. The flap section is hinged to a swivel fitting 52 which passes through the space toggle fitting 47 and is free to rotate therein. Suitable apertures 54 are provided for the space toggle arm in the flap and in the wing, and are elongated to accommodate the arm when the flap is closed.

I prefer, when the wing flap is open, to have the space toggle arm approximately perpendicular to the wing rod. In this position, the arm is best situated to receive straight compression stress, the stress tending to close the flap being, of course, greatest when the flap is fully open.

Starting from full closed position, I shall assume that the pistons in cylinder 24 are closely abutting one another at the center of the cylinder. Liquid forced into the central portion of the cylinder between the pistons causes the pistons to be forced apart, thus moving the wing rods toward the fuselage. This motion pulls the upper part of the space toggle toward the fuselage, the space toggle arm leaving its folded position and extending the flap outwardly on its hinge. At the full length of piston travel the flap will be fully open, the space toggle moving in three dimensions until it reaches an angle of approximately eighty degrees to the wing rod. In order that the arm assume this position, it is necessary that the arm turn at one end in the space toggle fitting 47 and that the wing rod itself turn slightly during the opening. This is accomplished by allowing the wing rods to turn on the long screw thread 38 at the central operating mechanism. In order to close the flap, liquid is admitted under pressure to the end inlets 39, and the wing rods forced outwardly from the fuselage, causing the space toggle to assume a smaller angle with the wing rod and approaching more and more a position approaching parallel to the wing rod, thus closing the flap.

If it should be found desirable, resilient means may be added at some point in the system to maintain the flaps tightly closed after all fluid has been withdrawn from the operating cylinder.

The above operating mechanism has been described as applied to the control, for example, of the complete set of lower surface flaps comprising wing flaps 22—22 and the center section flap 20. It is, of course, obvious that the upper surface flaps 21—21 can be controlled by a similar separately operated control mechanism. I prefer, however, to interlink the operating devices so that all three lower surface wing flaps may be opened for landing purposes, for example, without opening the upper surface flaps; and so that both upper and lower surface wing flaps may be opened simultaneously without opening the lower surface center section flap. In this latter way I control air speed in diving. Simultaneous opening of the flaps applies a large retarding drag without affecting the longitudinal trim to an appreciable extent.

This selective action of the control mechanism is obtained by the use of one form of a selective interlinkage as shown in Figure 7, where three different linkage positions are shown.

The central position shows rods A, B and C in position with all flaps closed. Rods A and B are attached to separate hydraulic operating mechanism. It should be noted that rod A goes directly to the upper wing flaps while rod C which comes from the lower wing flaps terminates in a yoke through which rods A and B pass. Rods A and B are provided with stops on the flap side of the yoke.

The selective operation is obtained, therefore, by the action of the stops on the yoke. If rod A is pulled, both upper and lower outer flaps are opened. If rod B is pulled, only the lower flap will open. If, therefore, the center section flap is connected to rod B, a pull thereon will open both lower surface wing flaps and the center section flap. If rod A is pulled, both upper and lower outer wing flaps will open simultaneously, but as rod B is not pulled, the center section flap will remain closed. As rod C is not positively driven on the closing motion, a spring closure or equivalent stress is applied to return the flap to closed position and keep it there. A convenient valve may be used to selectively operate the two systems.

It may be that hydraulic power is not available. In that case, I have utilized electric motors to actuate the wing rods. Other power sources will suggest themselves to those skilled in the art.

The flap-operating means above described has many advantages. Power may be transmitted by a stiff hollow rod which is positive and strong, eliminating many of the defects of cables. A single power source is available to operate flaps on opposite ends of the wings. The system is such that hand operation is practical as the power source is centrally located.

One of the major features which may be pointed out is the use of a solid space toggle arm between wing and flap. By solid, I refer to the lack of joints or elbows in the arm, the arm being stiff and strong in all positions. The arm is easily covered when the flap is closed with a minimum of cutting in the wing structure. The arm being approximately perpendicular to the wing rod when extended is in the best position to withstand the compression stress and during the opening and closing has a true toggle action. Furthermore, the structure is such that two wing rods, one for the upper flap and one for the lower are closely associated so that the compression strains oppose each other with a minimum of intervening structure.

I am thus able to obtain maximum operational result from the flaps. For landing, I open all three lower surface flaps and thus obtain maximum drag and lift at high attack angles. For diving, I open, preferably simultaneously, the upper and lower outer wing flaps only and by adjusting their relative angle and, therefore, their relative frontal area, I can obtain a wing of relatively high drag, thus limiting terminal velocities. I obtain this drag with no appreciable change in pitching moment at any position from full open to closed, and therefore, I need not disturb any stabilizer or remote control surfaces, these being available in full to the pilot for control in the dive. Excessive strains on the fuselage are avoided, excessive air speeds are prevented, and vertical diving may be performed at relatively low air speeds. It should also be noted that the ailerons, being outside of the flaps are operating in airflow which is not in the turbulent area caused by the flaps, and that, in diving, the tail control surfaces are inside the turbulent area and are, therefore, fully operative at all times.

While I have described my invention as applied to airplanes in landing and diving positions, I wish it to be understood that the positions are illustrative only and that the results obtained are available and operative where the desired effects are similar to those of the described positions.

I claim:

1. In an airplane having a fuselage and a wing having upper surfaces extending laterally from said fuselage, and a lower surface substantially continuous from tip to tip, a lateral upper surface flap on each wing, an opposing lateral lower surface flap on each wing, and a central lower surface flap between said lateral lower surface flaps, means for rotating all three lower surface flaps simultaneously without moving said upper surface flaps, and means for simultaneously rotating opposing upper and lower surface flaps without rotating said central lower surface flaps.

2. In an airplane having a fuselage and a wing having upper surfaces extending laterally from said fuselage, and a lower surface substantially continuous from tip to tip, means simultaneously operable to produce equal and opposing upper and lower surface drags on said wing on opposite sides of said fuselage, means for removing the upper surface drags and for simultaneously applying an additional central lower surface drag between said lateral lower surface drags.

JOHN K. NORTHROP.